Patented Apr. 24, 1928.

1,667,675

UNITED STATES PATENT OFFICE.

HOWARD VINCENT POTTER AND JOHN WILLIES CRUMP, OF BIRMINGHAM, ENGLAND, ASSIGNORS TO THE DAMARD LACQUER COMPANY LIMITED, OF LONDON, ENGLAND, A BRITISH COMPANY.

ACCELERATOR FOR HARDENING PHENOL UREA PRODUCTS.

No Drawing. Application filed September 11, 1926, Serial No. 134,938, and in Great Britain October 23, 1925.

According to United States Patent application Serial No. 105,582, synthetic resin products are obtained by the condensation of ureas, aldehydes and a substantial proportion of phenols; these substances are mixed together and heated, the products are then dehydrated by heating in an open pan or by evaporation in vacuo; they are then in an intermediate stage of their manufacture in which they take the form of a syrup or of a solid or semi-solid resin; they are then rendered hard and insoluble by a further heating. According to the present invention the intermediate products above referred to are directly converted into the final hardened form by means of hardening agents. This conversion is normally effected in the cold. Heat may, however, be applied to hasten the reaction or to obtain a more intimate mixture between the hardening agent and the syrup itself, but this application is not necessary and is not of so long a duration or of such intensity as when no hardening agent is used.

The hardening agents used are in general strong acids either mineral or organic, such as sulphuric acid, nitric acid, hydrochloric acid, phosphoric acid and oxalic acid, or salts which have an acid reaction such an aniline hydrochloride, urea nitrate, ammonium chloride, phenyl-hydrazine hydrochloride, and ammonium sulphocyanide.

In United States Patent application Serial No. 105,582, the fact is mentioned that an accelerator may be used and an example is given of ammonia for such use. Free mineral acid may also be used in this capacity, i. e. as an accelerator, when working according to United States Patent application Serial No. 105,582. When free mineral acid is used as a hardening agent according to the present invention, however, it is used in considerably greater quantity than in the preparation of the original syrup according to United States Patent application Serial No. 105,582, the quantity being as much as up to 5% or more of the total reacting materials.

The syrup prepared according to United States Patent application Serial No. 105,582, is treated in the cold with the hardening agent by putting the hardening agent, which (if a salt) is usually in the solid form, into it and well stirring the whole until intimately mixed; it is then allowed to stand and harden. The lower the percentage of the hardening agent the longer the time for hardening. Hardening begins to set in immediately after the stirring commences and finally the mass becomes quite solid and infusible and is insoluble in all solvents, including water. There are two distinct phases in the hardening; the material at first simply becomes hard and solid but is still fusible and soluble; the change then gradually goes on and the material becomes permanently hard and infusible and quite insoluble. No heat is required in this process of hardening.

The rate of hardening depends upon:—

(1) The proportion of phenol used to the urea in the preparation of the original syrup.

(2) Whether or not an accelerator or condensing agent was used in the preparation of the original syrup; and upon the type of such accelerator or condensing agent used.

(3) The chemical used as the hardening agent according to the present invention.

(4) The amount of the hardening agent thus used.

The influence of the above factors upon the rate of hardening will now be described in greater detail.

(1) *The proportion of phenol to urea.*—The greater the proportion of urea to phenol, the more rapid is the rate of hardening. For example, using an addition of urea nitrate equal to 10% by weight of the syrup as the hardening agent, a syrup of the following proportions, namely:

100 parts by weight of phenol.
200 parts by weight of urea.
600 parts by volume of formaldehyde, 40% solution.

No accelerator or condensing agent, sets to the first phase of hardening in from 5 to 10 minutes and becomes permanently hard and infusible in from 1 to 1½ hours; and a syrup of the following proportions, namely—

100 parts by weight of phenol.
34 parts by weight of urea.
185 parts by volume of formaldehyde, 40% solution.

No accelerator or condensing agent, sets to the first phase of hardening in from 30 to 35 minutes and becomes permanently hard and infusible in several days.

(2) *Use of an accelerator.*—The rate of hardening depends upon whether an accelerator is used for preparing the original syrup and upon the type of such accelerator.

An example with an alkaline condensing agent is as follows:

100 parts by weight of phenol.
200 parts by weight of urea.
600 parts by volume of formaldehyde, 40% solution.
15 parts by volume of ammonia of specific gravity .880.

Using an addition of urea nitrate equal to 10% by weight of the above syrup as the hardening agent, the above sets to the first phase of hardening in 2½ minutes and becomes permanently hard and infusible in 45 minutes.

An example with an acid condensing agent is as follows:—

100 parts by weight of phenol.
34 parts by weight of urea.
185 parts by volume of formaldehyde, 40% solution.
.01 part by weight of oxalic acid.

Using an addition of urea nitrate equal to 10% by weight of the above syrup as the hardening agent, the above sets to the first phase of hardening in 1 minute and becomes permanently hard and infusible in 1 hour.

(3) *The hardening agent employed.*—The rate of hardening is materially affected by the actual hardening agent employed. The following is a list of some hardening agents, the mineral acid being the most active in this respect.

(a) *Strong acids both mineral and organic.*—Sulphuric acid, hydrochloric acid, phosphoric acid, oxalic acid, etc.

(b) *Salts which have an acid reaction.*—Aniline hydrochloride, urea nitrate, ammonium sulphocyanide, etc.

(4) *Amount of hardening agent used.*—The lower the percentage of the hardening agent, the longer the time for hardening. If the proportion of hardening agent used were excessive the hardening would take place too rapidly to be convenient and a simple preliminary test will indicate the practicable limits.

Whilst the invention refers to the process without the use of heat for hardening, we may employ heat to hasten the reaction. If the syrup be warm when the hardening agent is incorporated, the warmth assists in obtaining an intimate mixture between the hardening material and the syrup itself.

The hardening product obtained by any of the above examples consists of a white or slightly coloured homogeneous hard mass which is infusible and insoluble in alcohol, ketones, and esters, and in solvents such as spirit, aniline, butyl alcohol, turpentine, and in weak mineral acids, etc., but it is slowly disintegrated by alkaline and strong acids.

We claim:—

1. In the manufacture of hard synthetic resin bodies by the process according to which an intermediate product is produced by the condensation of a phenol, a urea and an aldehyde in the presence of a substantial proportion of the phenol and by subsequently dehydrating the resulting product, the step of treating said intermediate product in the cold with a hardening agent having an acid reaction.

2. The process as claimed in claim 1, wherein the hardening agent is urea nitrate.

In testimony whereof we have signed our names to this specification.

HOWARD VINCENT POTTER.
JOHN WILLIES CRUMP.